Dec. 29, 1964 F. M. BAILEY 3,163,860

OBJECT IDENTIFICATION SYSTEM

Filed Aug. 21, 1962 7 Sheets-Sheet 1

INVENTOR.
FRANCIS M. BAILEY

BY J. T. Comfort

ATTORNEY

INVENTOR.
FRANCIS M. BAILEY
BY J. T. Comfort
ATTORNEY

INVENTOR.
FRANCIS M. BAILEY
BY J. T. Comfort
ATTORNEY

INVENTOR.
FRANCIS M. BAILEY
BY J. T. Comfort
ATTORNEY

OBJECT IDENTIFICATION SYSTEM

Filed Aug. 21, 1962 7 Sheets-Sheet 5

INVENTOR.
FRANCIS M. BAILEY
BY J. T. Comfort
ATTORNEY

Dec. 29, 1964 F. M. BAILEY 3,163,860

OBJECT IDENTIFICATION SYSTEM

Filed Aug. 21, 1962 7 Sheets-Sheet 6

INVENTOR.
FRANCIS M. BAILEY

BY J. T. Comfort

ATTORNEY

INVENTOR.
FRANCIS M. BAILEY
BY J. T. Comfort
ATTORNEY

United States Patent Office 3,163,860

Patented Dec. 29, 1964

3,163,860

OBJECT IDENTIFICATION SYSTEM

Francis M. Bailey, Roanoke, Va., assignor to General Electric Company, a corporation of New York Filed Aug. 21, 1962, Ser. No. 218,305

5 Claims. (Cl. 343—6.5)

This invention relates to an object identification system and more particularly to an object identification system for identifying objects while the objects are moving. In the preferred embodiment described herein, the objects identified are freight cars or hand trucks in a freight house. The identification system may be used in identifying any similar objects.

When a large number of objects pass a location, it is often desirable to identify the objects to control their later movement or check that they actually have passed the location. For example, one of the primary problems in railway freight handling has been the manner in which the freight car has been identified since the freight car must be identified many times before it reaches its destination. Similarly, other articles must be identified during handling, such as in mailbag handling and freight house handling.

Many devices have been proposed to identify objects such as freight cars. Yet, in most instances, identification numbers on the objects are visually read while the objects are stopped or traveling at a slow speed; and each identification number is written down, as has been the practice for many years. Such practice has been, and continues to be, time consuming and subject to errors.

It is therefore an object of this invention to provide a new and improved object identification system for identifying objects as the objects are moving. Another object of this invention is to provide a new and improved object identifying system for automatically identifying objects quickly and accurately as the objects are moving.

For an effective identification system, each object such as a car must be equipped to operate in the identification system; and the identification must be accurate. For safety reasons, in freight car identification systems, the wayside portion of the identification system must be a sufficient distance from the freight car as it passes so that nothing trailing or hanging from the freight car will catch on the wayside station. The identification device on each freight car must be relatively inexpensive in view of the two million or more freight cars in service that have to be so equipped.

Heretofore, there have been some identification systems which are accurate, in some systems the identification device on each freight car has been expensive and some have operated with the wayside station portion of the identification system a sufficient distance away from the side of the railroad cars to satisfy the safety requirements. However, most of the previous identification systems do not satisfy one or more of these requirements.

It is therefore an object of this invention to provide a new and improved identification system with inexpensive identification devices on the vehicles or objects being identified.

Another object of this invention is to provide a new and improved identification system which operates with the wayside portion of the identification system a substantial distance away from objects or vehicles being identified.

In accordance with the principles of this invention, a power source located at a wayside station produces an A.C. waveform. The A.C. waveform is picked up by a first receiver on the object being identified as the object is identified. The first receiver applies the A.C. waveform to a transmitter and a data source identifying the second location. The transmitter transmits the waveform applied thereto, and the data source imposes identification data on the A.C. waveform transmitted by the transmitter.

A second receiver at the wayside station receives the waveform carrying the identification data, which is then removed and decoded to indicate the identity of the moving object.

The invention is set forth with particularity in the appended claims. The principles and characteristics of the invention, as well as other objects and advantages are revealed and discussed through the medium of the illustrative embodiments appearing in the specification and drawings which follow.

In the preferred embodiment a freight car or other vehicle travels past a wayside station with an identification device fastened to the side of the freight car. A signal from the wayside house drives a coil mounted at trackside parallel with the position that the identification device will pass and about four feet from the tracks. The waveform is picked up by the identification device. The identification device, in response to the waveform picked up, produces an identification code which is transmitted by the identification device.

The identification code is received by an antenna at trackside and converted into usable data. Thereafter, the identification code is used to indicate the identity of the freight car which has passed by the wayside station.

Figure 1:
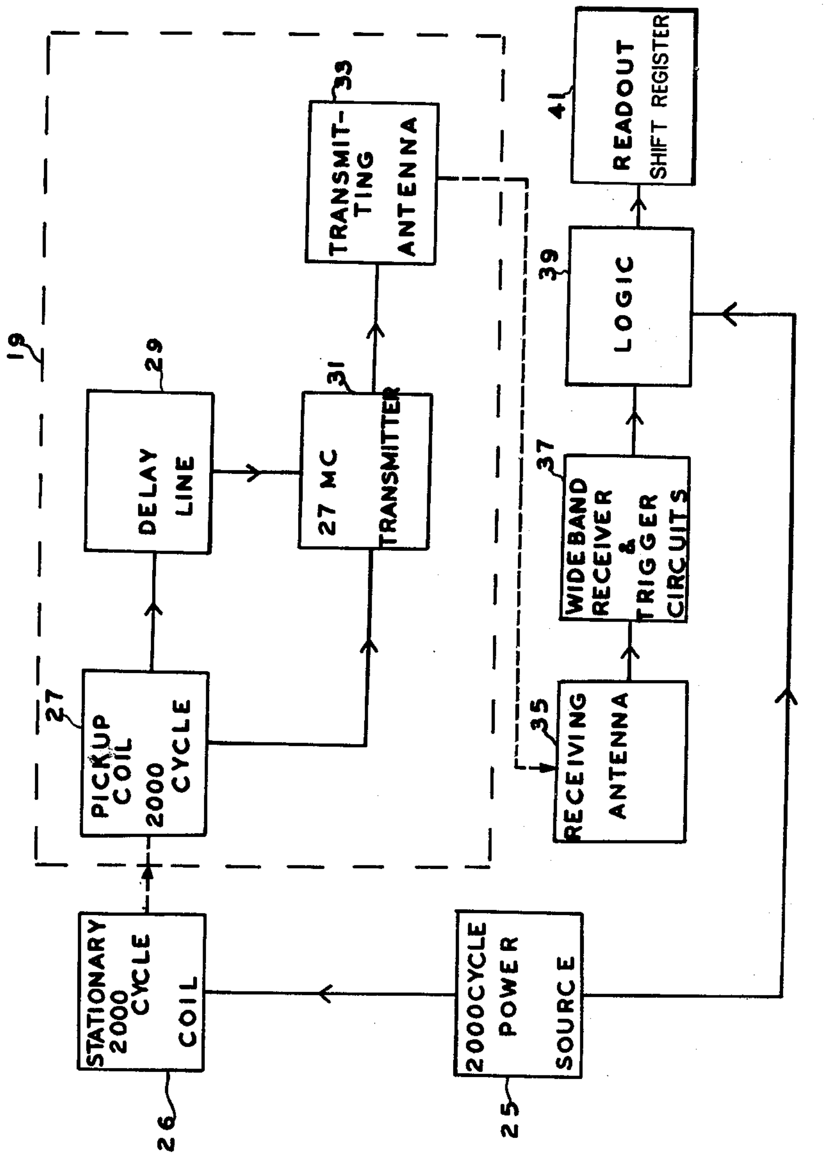
FIG. 1 is a block diagram of an identification system constructed in accordance with the principles of this invention.
Figure 2:
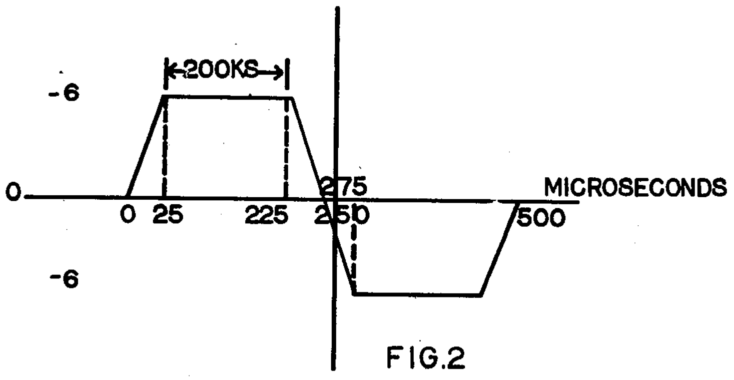
FIG. 2 shows the waveform produced by the 2000 cycle power source.

Referring now to FIG. 1, the identification system is shown in block diagram form with each element in the system shown as a block.

The trackside portion of the identification system consists in part of a primary power source 25 producing a 2000 cycle square wave driving a stationary coil 26.

The 2000 cycle square wave is picked up by a pickup coil 27 in the identification device 19 mounted on the freight car. The pickup coil 27 applies the 2000 cycle square wave to a delay line 29 and a transmitter 31, both constituting part of the identification device 19. The delay line 29 is coded to specifically identify the freight car on which it is mounted. Delay line 29 in response to the 2000 cycle wave applies a plurality of pulses identifying the freight car to transmitter 31, where the pulses modulate the 2000 cycle square wave applied to the transmitter 31. The 2000 cycle square wave with the identification pulses riding thereon is applied to the transmitting antenna 33, where the waveform carrying the identification pulses is transmitted.

Receiving antenna 35 at the trackside location receives the waveform and applies it to receiver 37. The receiver 37 demodulates the waveform and applies the identification pulses to the logic element 39. The logic element 39 converts identification pulses into usable signals which are stored in a shift register 41.

Following is a detailed description of the elements used in the preferred embodiment of this invention.

2000 CYCLE POWER SUPPLY

The 2000 cycle power supply may be any power source which produces a 2000 cycle wave. A square wave is preferable. Many convenient power sources have sinusoidal output, and the sine wave from such a power source may be converted to a square wave by clipping the sine wave with a Zener diode in a well known manner.

Figure 3:
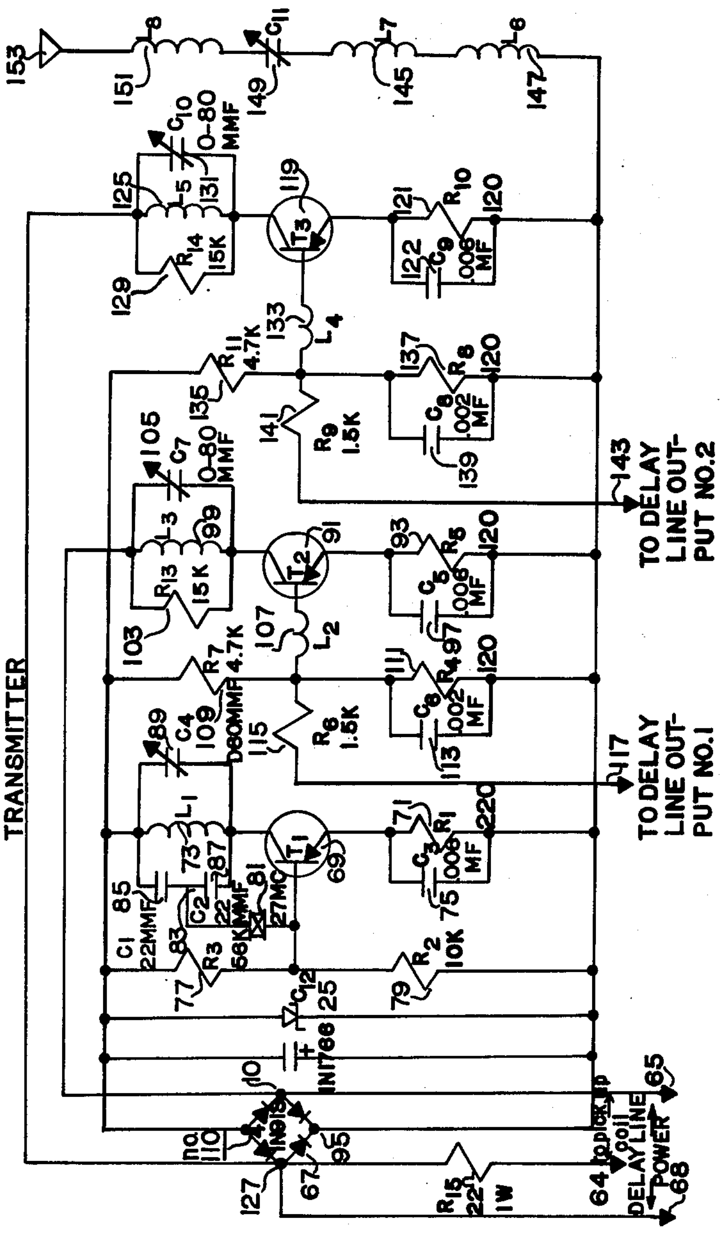
FIG. 3 is a schematic of the transmitter on the vehicle being identified.

A square waveform suitable for this purpose is shown in FIG. 3.

STATIONARY COIL AND PICKUP COIL

Any well known coil capable of transmitting a 2000 cycle square waveform may be used to transmit the 2000 cycle square waveform produced by the 2000 cycle power source, and any well known pickup coil may be used to pick up the 2000 cycle square wave at the identification device on the freight car.

DELAY LINE

The delay line consists of identical sections for producing pulses spaced in time to the initiating signal. Each section 43 through 46 shown in FIG. 4 consists of an inductance 47, a capacitance 49 and a saturable core 51. Each saturable core 51 has a primary winding 53 and two secondary windings 55 and 57. To compensate for attenuation of the waveform, the saturable cores further down the line have a greater turns ratio.

The 2000 cycle square wave is applied to terminal 59 of the coded delay line and the saturable cores 51 saturate sequentially as the wavefront of the waveform if propagated along the line. A pulse is produced at each of the secondary windings 55 and 57 as the positive half cycle is propagated along the line, and a pulse is produced at each of the secondary windings 55 and 57 as the negative half cycle is propagated along the line. Each pair of pulses from the secondary windings 55 and 57 is displaced a predetermined time later than the start of the interrogating waveform applied to input terminal 59 of the coded delay line. The time displacement between the output pulses is determined by the saturable core 51, the inductance 47 and the capacitance 49 in each section.

By looking at the output pulses from secondary windings 55 during the positive half cycle and looking at the output pulses from the secondary windings 57 during the negative half cycle, eight bits of information may be produced from the four saturable core delay lines. Each bit represents an order in a binary number.

In this particular embodiment a positive pulse produced from a secondary winding indicates a "one," and each negative pulse represents a "zero." Whether a negative or positive pulse is produced from the secondary windings depends on which way the secondary winding is wound on the saturable core, and whether the waveform applied to the saturable core is negative or positive.

Figure 5:
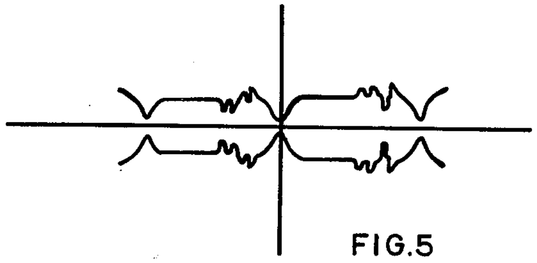
FIG. 5 shows the output from one set of windings on the delay line.

Assume that the delay line is coded to a binary value, 00111101. Therefore, the delay line should produce in succession two negative pulses, four positive pulses, one negative pulse and one positive pulse. Secondary windings 55 should be so wound to produce a negative pulse from stage 43, a negative pulse from stage 44, a positive pulse from stage 45 and a positive pulse from stage 46 upon the positive half of a waveform being applied to input terminal 59 (see FIG. 5). This represents the binary number 0011. Conversely, secondary windings 57 should be so wound to produce a positive pulse from stage 43, a positive pulse from stage 44, a negative pulse from stage 45 and a positive pulse from stage 46 upon the negative half of a waveform being applied to input terminal 59 (see FIG. 5). This represents the binary number 1101.

Figure 6:
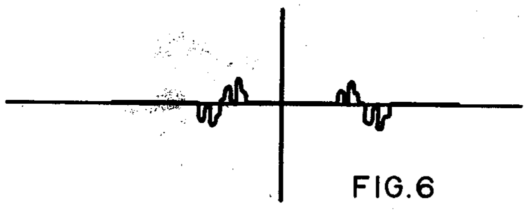
FIG. 6 shows the output from a second set of windings on the delay line.
Figure 7:
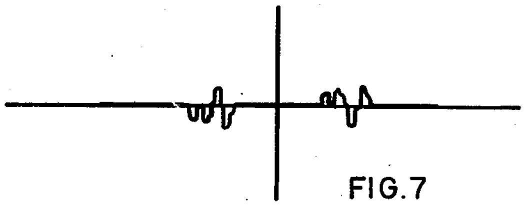
FIG. 7 shows the waveform transmitted by the transmitter as modulated by the outputs from the two sets of windings on the delay line.
Figure 8:
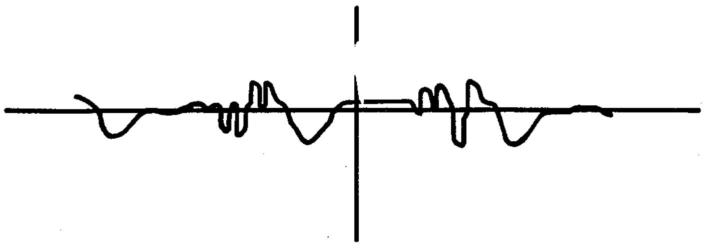
FIG. 8 shows the waveform produced by the receiver.

Of course, secondary windings 55 produce the opposite output pulses during the negative half cycle that they produce during the positive half cycle as shown in FIG. 6. The output pulses produced during the negative half cycle are shown on the right of the center line of FIG. 6 and the pulses produced on the positive half cycle are shown on the left of the center line. Also, the secondary windings 57 produce the opposite output pulses during the positive half cycle that they produce during the negative half cycle as shown in FIG. 8. The output pulses produced during the positive half cycle are shown on the right and the pulses produced during the negative half cycle are shown on the left. These signals are not used as will become apparent later during this description. The output pulses shown on the right of the center line on FIG. 6 and on the left of center line on FIG. 7 are not used.

The coded pulses from secondary windings 55 are delivered on output terminals 60 and the coded pulses from secondary windings 57 are delivered on output terminals 61 and 62.

A prescribed number of saturable cores can thus be used to produce twice that number of binary coded pulses. The cost of the identification device on each article or vehicle being identified may thus be substantially reduced.

TRANSMITTER

The 2000 cycle waveform is received from the pickup coil and applied to terminals 64 and 65 of the transmitter in FIG. 3. The 2000 cycle waveform is delivered to the delay line in FIG. 3 on terminals 65 and 68. A bridge circuit 67 is connected to the input terminals 65 and 64 to rectify the A.C. input to D.C. A PNP transistor 69 has its emitter connected through resistor 71 to one terminal of bridge circuit 67 and its collector connected through a primary winding 73 to the other terminal of bridge circuit 67. Capacitor 75 is connected across resistor 71. The base of PNP transistor 69 is connected through resistor 77 to one terminal of bridge circuit 67 and through resistor 79 to the other terminal of bridge circuit 67. A 27 mc. crystal 81 is connected to the base of PNP transistor 69 and to a midpoint 83 between capacitors 85 and 87. The voltage divider formed by capacitors 85 and 87 is connected across primary winding 73. Adjustable capacitor 89 is also connected across primary winding 73.

The emitter of transistor 91 in the first modulating stage is connected through resistor 93 to terminal 95 of the bridge circuit 67. Capacitor 97 is connected across resistor 93. The collector of transistor 91 is connected through primary winding 99 to terminal 101 of bridge circuit 67 which is also connected to input terminal 65. Resistor 103 and adjustable capacitor 105 are connected in parallel across primary winding 99. The base of PNP transistor 91 is connected through secondary winding 107 and resistor 109 to terminal 110 of bridge circuit 67 and through secondary winding 107 and resistor 111 to terminal 95 of bridge circuit 67. Capacitor 113 is connected across resistor 111. The base of transistor 91 is also connected through secondary winding 107 and resistor 115 to terminal 117. Terminal 117 is connected to terminal 60 of the coded delay line in FIG. 4 which produces coded pulses responsive to the positive half cycle of the 2000 cycle waveform. Secondary winding 107 is coupled to primary winding 73 to introduce the 27 mc. carrier wave to the base of transistor 91.

The second modulating stage using transistor 119 is identical to the first modulating stage using transistor 69 except that it operates on the negative half cycle of the power frequency.

The emitter of transistor 119 in the second modulating stage is connected through resistor 121 to terminal 95 of the bridge circuit 67. Capacitor 122 is connected across resistor 121. Capacitor 139 is connected across resistor 137. The collector of transistor 119 is connected through primary winding 125 to point 127 of bridge circuit 67 which is also connected to input terminal 64. Resistor 129 and adjustable capacitor 131 are connected in parallel across primary winding 125. The base of transistor 119 is connected through secondary winding 133 and resistor 135 to terminal 109 of bridge circuit 67 and through secondary winding 133 and resistor 137 to terminal 95 of bridge circuit 67. Capacitor 139 is connected across resistor 137. The base of transistor 119 is also connected through secondary winding 133 and resistor 141 to terminal 143, which is connected to terminal 61 of the coded delay line in FIG. 4, and produces coded pulses responsive to the negative half cycle of the 2000 cycle waveform. Secondary winding 133 is coupled to primary winding 73 to introduce the 27 mc. carrier wave to the base of transistor 119.

The output is taken from secondary windings 145 and 147 which are secondaries wound on the primary windings 125 and 95, respectively. Thus, secondary winding 145 transmits the modulated carrier wave from the second modulated stage; and secondary winding 145 transmits the modulated carrier wave from the first modulated stage. The secondary windings 145 and 147 are connected in series through an antenna compensating trimmer 149 and an antenna loading coil 151 to an antenna 153.

OPERATION OF THE TRANSMITTER

The 2000 cycle square waveform is picked up by the pick-up coil and rectified to a D.C. level by the rectifying bridge circuit 67. The oscillator stage of PNP transistor 69 begins to oscillate, producing the 27 mc. carrier wave in the primary winding 73 in the collector circuit of transistor 69.

The 27 mc. wave is introduced at the base of transistor 91 by the secondary winding 107, wound on primary winding 73 and at the base of transistor 119 by the secondary winding 133, also wound on primary winding 73.

The first modulator stage of transistor 91 is turned on during the positive half cycle of the 2000 cycle square waveform when the collector of PNP transistor 91 is connected to a negative source of voltage. The 27 mc. wave introduced at the base by the secondary winding 107 causes a 27 mc. wave to be produced in the primary winding 95 in the collector circuit of transistor 91. The 27 mc. wave is transmitted by the secondary coil 147 wound on the primary winding 95.

Figure 4:
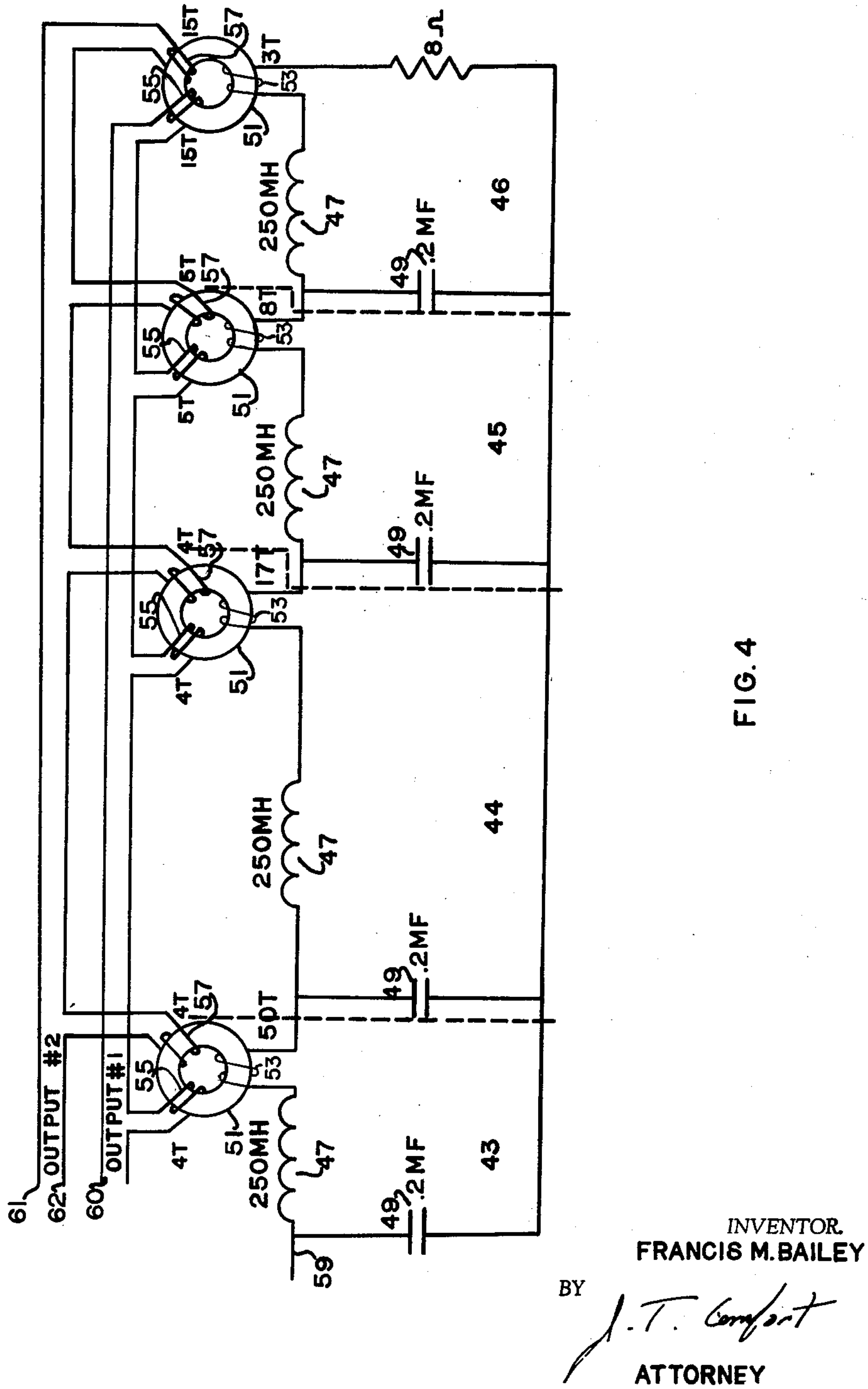
FIG. 4 is a schematic of the delay line which identifies the vehicle.
Figure 9:
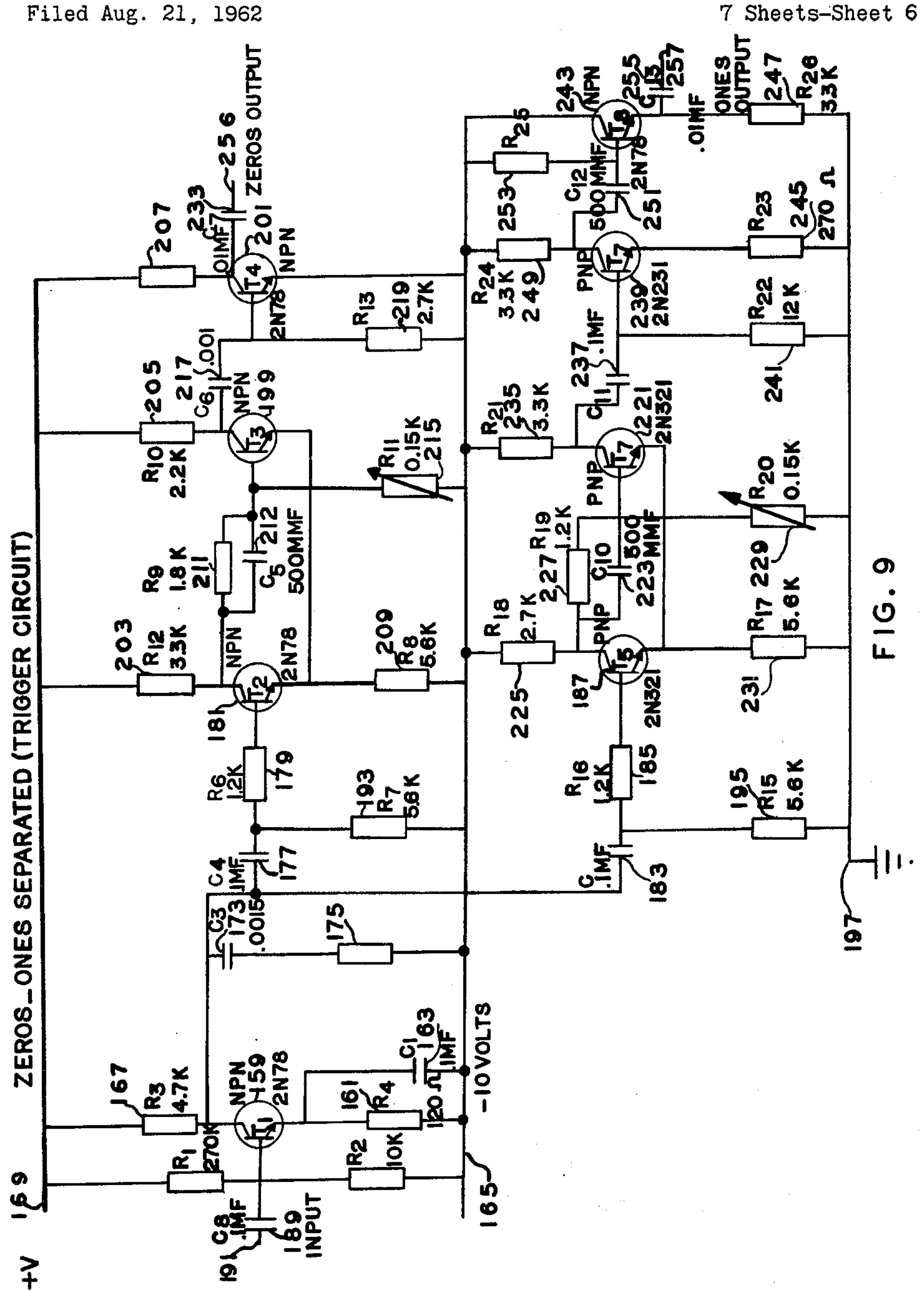
FIG. 9 shows the logic which responds to the waveform produced by the receiver shown in FIG. 8.

The output negative and positive pulses from secondary windings 55 on the saturable cores in FIG. 4 are applied from output terminals 60 to input terminal 117 in FIG. 3 to modulate the 27 mc. wave during the positive half cycle. In FIG. 9 the 27 mc. carrier wave is shown with the two negative and two positive pulses shown in FIG. 6 imposed on the first half of the 27 mc. carrier wave. The 27 mc. wave with the binary coded output pulses from the delay line shown in FIG. 4 imposed thereon is transmitted from the secondary winding 147 during the positive half cycle of the 2000 cycle square waveform.

The second modulator stage of transistor 119 is turned on during the negative half cycle of the 2000 cycle square waveform when the collector of PNP transistor 119 is connected to a negative source of voltage. The 27 mc. wave introduced at the base of transistor 119 by the secondary winding 133 causes a 27 mc. wave to be produced in the primary winding 125 in the collector circuit of transistor 119. This 27 mc. wave is transmitted by the secondary coil wound on the primary winding 125.

The output negative and positive pulses from secondary windings 57 of saturable cores in FIG. 4 are applied from output terminals 61 to input terminal 143 in FIG. 3 to modulate the 27 mc. carrier wave during the negative half cycle of the 2000 cycle square wave. In FIG. 9 the 27 mc. wave transmitted by the secondary winding 147 is shown with the two positive, one negative and one positive pulse shown in FIG. 7 as produced by the secondary winding 57 on saturable cores 51 in FIG. 4, imposed on the second half of the 27 mc. carrier wave. The 27 mc. wave with the binary coded output pulses from the delay line shown in FIG. 4 imposed thereon is transmitted from the secondary winding 147 during the negative half cycle of the 2000 cycle square waveform.

Thus, it has been described how during a complete cycle of the 2000 cycle square wave received from the wayside station, a 27 mc. carrier wave with an eight bit binary coded number imposed therein is transmitted.

RECEIVER

A wide band receiver is required which should have approximately a 100 kc. bandwidth. This receiver should be capable of picking up the 27 mc. signal at approximately 25 feet to give enough output to drive the decoding logic which will be described hereinafter. Such a receiver can be constructed using well known radio receiving techniques. The output from the receiver is shown in FIG. 8 riding on top of the 2000 cycle half wave. The identification number can readily be seen as 00111101 by the two negative pulses, four positive pulses, a negative pulse and a positive pulse.

DECODING LOGIC READOUT

The emitter of NPN transistor 159 in FIG. 9 is connected through resistor 161 and capacitor 163 in parallel to common 165. The collector of NPN transistor 159 is connected through resistor 167 to common 169 and through capacitor 171 in series with resistor 175 to common 165. The collector of NPN transistor 159 is also connected through capacitor 177 and resistor 179 to the base of NPN transistor 181 and through capacitor 183 and resistor 185 to the base of PNP transistor 187.

The base of NPN transistor 159 is connected through capacitor 189 to input terminal 191.

The base of NPN transistor 181 is connected to common 165 through resistor 179 and resistor 193. The base of PNP transistor 187 is connected through resistor 185 and resistor 195 to common 197.

The collectors of NPN transistors 181, 199 and 201 are connected through resistors 203, 205 and 207, respectively, to common 169. The emitters of NPN transistors 181 and 199 are connected to common 165 through resistor 209, and the emitter of NPN transistor 201 is connected directly to common 165.

NPN transistors 181 and 199 form a trigger circuit with the collector of NPN transistor 181 connected through resistor 211 and capacitor 212 in parallel to the base of NPN transistor 199. The base of NPN transistor 199 is also connected through variable resistor 215 to common 165.

The collector of NPN transistor 199 is connected through capacitor 217 to the base of NPN transistor 201. The base of NPN transistor 201 is also connected through resistor 219 to common 165.

PNP transistors 187 and 221 form a trigger circuit with the collector of PNP transistor 187 connected through capacitor 223 to the base of PNP transistor 221. The collector of PNP transistor 187 is also connected through resistor 225 to common 165 and through resistor 227 and variable resistor 229 in series to common 197. The emitters of PNP transistor 187 and 221 are connected through resistor 231 to common 197. The base of PNP transistor 187 is also connected through resistor 185 and resistor 195 to common 197.

The collector of PNP transistor 221 is connected through resistor 235 to common 165. The collector of PNP transistor 221 is also connected through capacitor 237 to the base of PNP transistor 239. The base of PNP transistor 239 is connected through resistor 241 to common 197. The emitter of PNP transistor 239 and the emitter of NPN transistor 243 are connected through resistors 245 and 247, respectively, to common 197. The collector of PNP transistor 239 is connected through resistor 249 to common 165 and through capacitor 251 to the base of NPN transistor 243. The base of NPN transistor 243 is also connected through resistor 253 to common 165, and the collector of NPN transistor 243 is connected directly to common 165. The emitter of NPN transistor 243 is connected through capacitor 255 to the ones output terminal 257.

OPERATION OF THE READOUT LOGIC

Input terminal 191 receives the output signal, shown in FIG. 9, from the receiver. The identification number in binary form represented by negative pulses for zeros and positive pulses for ones is supplied during the positive cycle of the 2000 cycle half wave. The negative pulses and the positive pulses are separated in the readout circuitry, and the operation of the circuit will first be explained for the negative pulses representing the binary zeros and then will be explained for the positive pulses representing the binary ones.

The 2000 cycle waveform from the receiver, with the identification number in the form of negative and positive pulses applied thereto, is applied to input terminal 191, amplified and inverted by NPN transistor 159. As the waveform is inverted, the negative pulses representing zeros are positive after inversion; and the positive pulses representing ones are negative after inversion by NPN transistor 159.

The one pulses, which are now negative, are applied to the base of NPN transistor 181 and to the base of PNP transistor 187. The negative one pulse turns on PNP transistor 187. With PNP transistor 187 turned on, the collector of PNP transistor 187 becomes positive, applying a positive pulse through capacitor 223 to the base of PNP transistor 221, turning that transistor off. With PNP transistor 221 turned off, the collector becomes negative, applying a negative signal through capacitor 237 to the base of PNP transistor 239, turning on PNP transistor. With PNP transistor 239 turned on, the collector becomes positive, applying a positive signal through capacitor 251 to the base of NPN transistor 243, turning on NPN transistor 243. With NPN transistor 243 turned on, the emitter of NPN transistor 243 becomes negative, producing a negative signal on output terminal 257.

When the negative one pulse passes, transistor 187 is again turned off, turning on PNP transistor 221. When PNP transistor 221 turns back on, PNP transistor 239 is turned off, and NPN transistor 243 is turned off, again producing a positive signal on output terminal 257.

Figure 10:
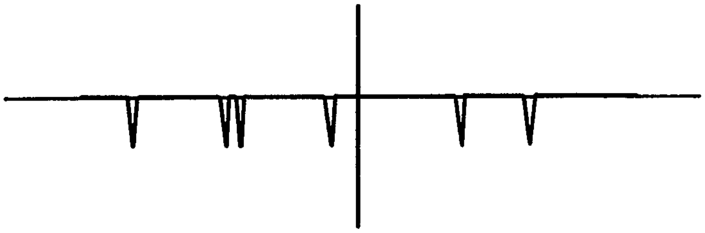
FIG. 10 shows the zero outputs from the logic shown in FIG. 9.

Thus, a negative pip is produced on output terminal indicating that a binary one has been detected on the 2000 cycle waveform transmitted from the transmitter on the moving vehicle and received by the receiver at the stationary station. A negative pip will be produced for every positive pulse riding on the 2000 cycle waveform received from the receiver on terminal 191. The negative pips produced from output terminal 257 are shown in FIG. 10 for the input signal received from the receiver shown in FIG. 8. Five negative pips are received, indicating that five binary ones are contained in the identification number. The negative pips are spaced in time as shown in the same manner that they were transmitted by the transmitter and received by the receiver.

The zero pulses which are now positive are applied to the base of NPN transistor 181 and to the base of PNP transistor 187. The positive zero pulse turns on NPN transistor 181, causing the collector of that transistor to go negative, applying a negative signal to the base of NPN transistor 199, turning that transistor off. With NPN transistor 199 turned off, the collector of that transistor goes positive, applying a positive signal to the base of NPN transistor 201, turning on that transistor. With NPN transistor 201 turned on, the collector of that transistor goes negative, applying a negative signal through capacitor 233 to terminal 256.

When the positive zero pulse passes, NPN transistor 181 is again turned off, turning on NPN transistor 199. When NPN transistor 199 is turned on again, NPN transistor 201 is turned off again, returning the signal produced on output terminal 256 to ground.

Thus, a negative pip is produced on output terminal 256 indicating that a binary zero has been detected on the 2000 cycle waveform transmitted from the transmitter on the moving vehicle, and received by the receiver at the stationary station. A negative pip will be produced for every negative pulse riding on the 2000 cycle waveform received from the receiver on terminal 191. The negative pips produced from output terminal 256 are shown in FIG. 10 for the input signal received from the receiver. It should be noted that an extra negative pip is generated in the readout logic by the 2000 cycle half wave modulation. Thus, in FIG. 10 six negative pips are indicated, three of which are due to the 2000 cycle half wave modulation. The extra pips may be blanked out in a manner to be described. The negative pips representing binary zeros are spaced in time with respect to each other and with respect to the binary ones in the same relation that they were produced from the transmitter identifying the moving vehicle.

STORAGE OF IDENTIFICATION NUMBER

Figure 12:
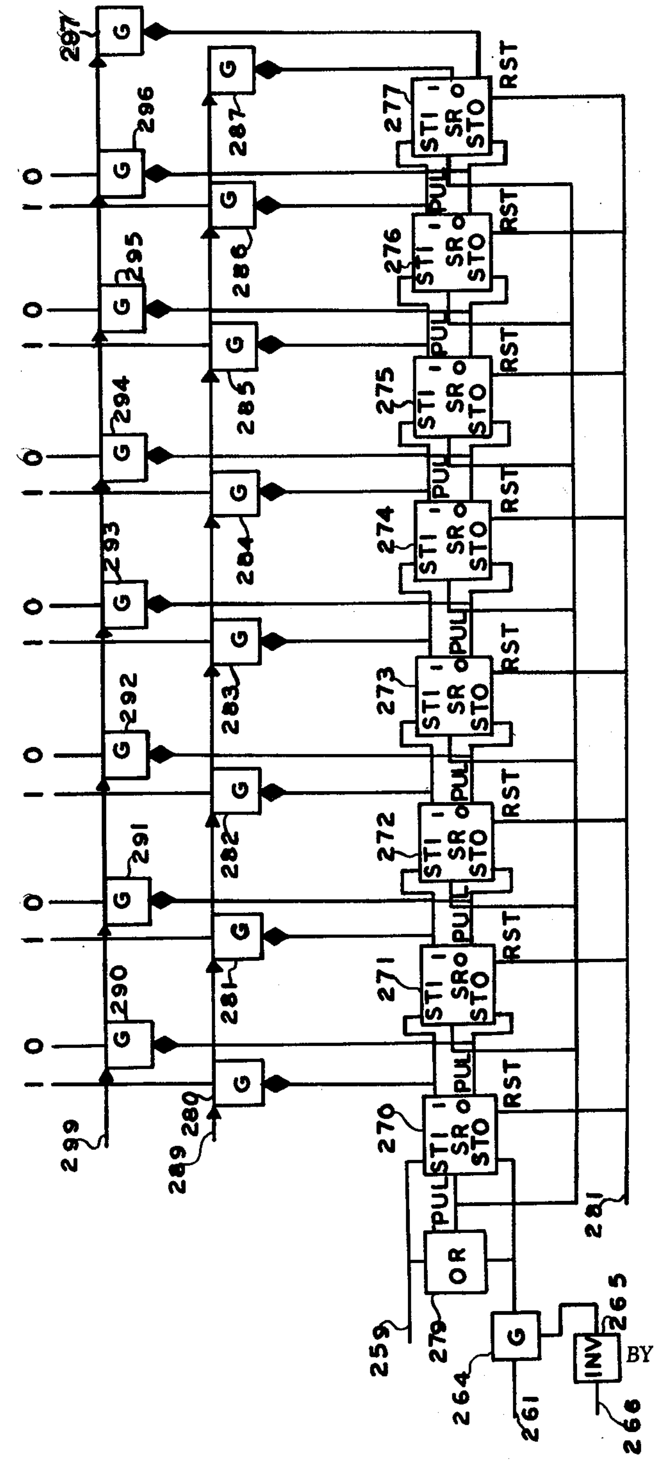
FIG. 12 shows a block diagram of a shift register which receives the outputs from the logic shown in FIG. 9.

Input pulses from the readout logic in FIG. 9 are received on input terminals 259 and 261 of the buffer storage register in FIG. 12. Input terminal 259 receives and supplies the negative pulses representing a binary one to the one input terminal of flip-flop 270. Input terminal 261 receives the negative pulses representing binary zeros and the negative pulses resulting for the 2000 cycle half wave modulation and applies these negative pulses to gate 264. The D.C. level to condition the gate 264 is supplied by inverter 265. Inverter 265 receives a signal on input terminal 266 from the D.C. level produced by bridge circuit 67 in FIG. 8 from the 2000 cycle square waveform.

The buffer storage register consists of eight shift register bits 270 through 277. Shift register bits are well known and operate in the following manner. If a negative signal is applied to the ST1 terminal (steer 1) at the same time that a negative pulse is applied to the PUL terminal (pulse terminal) the shift register bit will be set to one with a signal appearing on the one output terminal. On the other hand, if a signal is applied to the ST0 (steer 0) terminal at the same time that a negative pulse is applied to the PUL terminal, the shift register bit will be reset to zero with a negative signal appearing on the zero output terminal. The shift register bit may be reset by applying a negative pulse to the RST (reset) terminal. The one and zero terminals are always the inverse of each other with a negative signal appearing on one terminal and a ground signal appearing on the other terminal.

The input terminal 259 receives the one negative pulses which are applied to the ST1 terminal of the first shift register bit 270, and the zero negative pulses received on input terminal 261 are applied to the ST0 terminal of the first shift register bit 270 after the negative pulses which modulated 2000 cycle half waves are blanked out. The negative pulses representing both binary one and binary zero are applied to OR circuit 279. All pulses received by OR circuit 279 are applied to the PUL input terminal of each of the shift register bits 270 through 277.

The output from the one terminal of each of the shift registers is connected to the ST1 input terminal of the following shift register, and the output from the zero terminal of each of the shift register bits is connected to the ST0 input terminals of the following shift register bits. Input terminal 281 is connected to the RST (reset) terminals of each of the shift register bits.

The one output terminals of each of the shift register bits 270 through 277 is connected to gates 280 through 287, and the zero output terminals of each of the shift register bits 270 through 277 is connected to gates 290 through 297. Input terminal 289 is connected to gates 280 through 287, and input terminal 299 is connected to gates 290 through 297. Outputs from gates 280 through 287 are labeled 1 and outputs from gates 290 through 297 are labeled 0.

Figure 11:
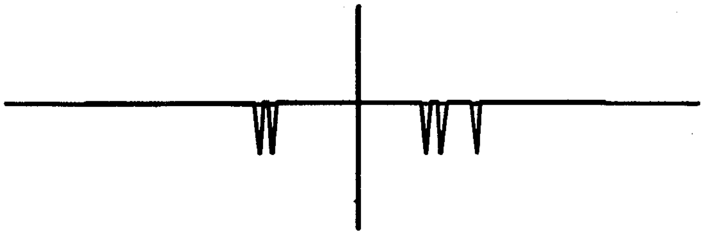
FIG. 11 shows the one output from the logic shown in FIG. 9.

For the description of the operation of the buffer storage register, assume that the identification code received in the form of negative pulses representing binary ones and zeros is the binary number 00111101. Thus, a negative pulse will be received on input terminal 261 due to the 2000 cycle half wave modulation, two negative pulses will be received on input terminal 261, representing two binary zeros, two negative pulses will be received on input terminal 259 representing two binary ones, a negative pulse will be received on input terminal 261 due to the 2000 cycle half wave modulation, two pulses will be received on input terminal representing two binary ones, a negative pulse will be received on input terminal 261 representing a binary zero, a negative pulse will be received on input terminal 259 representing a binary one and a negative pulse will be received on input terminal 261 due to 2000 cycle half wave modulation. The negative pulses will be received on input terminal 259 and 261 in the order recited and shown in FIGS. 10 and 11.

Input terminal 266 receives a positive D.C. signal from the bridge circuit in FIG. 8 which is inverted by inverter 265 to a negative signal and applied to gate 264 to condition gate 264 to pass the negative pulses applied thereto. Bridge circuit 67 in FIG. 8 supplies no D.C. signal during the 2000 cycle half wave modulation, so no signal is received on terminal 266 at that time; and gate 264 is not conditioned during the 2000 cycle half wave modulation. Therefore, the negative pulses from the readout logic on terminal 256 due to the 2000 cycle half wave modulation are not passed by the gate 264. The gate 264 is conditioned to pass the negative pulses representing binary zeros.

Before an identification number is read, the shift register is reset by applying a negative pulse to input terminal 281. For the binary number 00111101, a negative pulse is received first on terminal 261 as shown in FIG. 10 representing a binary zero. The gate 264 is conditioned at this time so that the negative pulse is applied to the ST0 terminal of shift register bit 270 and passed by OR circuit 279 to be applied to the PUL input terminal of shift register bit 270. Shift register bit 270 is therefore reset to zero, with a negative signal produced on the zero output terminal of shift register 270 and applied to the ST0 input terminal of shift register bit 271. The next negative pulse received is also received on input terminal 261 representing a binary zero and shift register bit 270 is reset against to zero; and shift register bit 271 is reset to zero, also due to the pulse received on the PUL terminal from OR circuit 279 and the negative signal applied to the ST0 input terminal. Thus, the first two shift register bits 270 and 271 are reset to zero in response to the first negative pulses received on input terminal 261 indicating two binary zeros.

The next negative pulse is received on input terminal 259, representative of a binary one, and applied to the ST1 input terminal of shift register bit 270, passed by OR circuit 279 and applied to the PUL input terminal of shift register bit 270. Shift register bit 270 is therefore set to one, with a negative signal produced on the one output terminal. The second and third shift register bits 271 and 272 are reset to zero as their ST0 input terminals had negative signals applied thereto at the time that the negative pulse was passed by OR circuit 279 and applied to the PUL input terminals of the shift register bits.

The operation described continues upon the receipt of each negative pulse representing a binary one or a binary zero until all eight negative pulses have been received. The binary identification number 00111101 is therefore stored in the buffer storage register with shift register bit 270 reset to zero, bit 271 reset to zero, bit 272 set to one, bit 273 set to one, bit 274 set to one, bit 275 set to one, bit 276 reset to zero and bit 277 set to one.

After the identification number is stored in the buffer storage register in the manner described, it may be utilized in any of the many well known manners. It may be directly decoded into a decimal number by well known binary to decimal converters and then used or may be converted into another convenient code, such as the Teletype code for transmission via Teletype. It may be transferred into a computer by pulsing input terminal 289 so that all gates 280 through 287 which have been conditioned by a D.C. signal from the one terminal of a corresponding shift register will pass an output pulse to set flip-flops in a register to one. Also, by pulsing input terminal 299, all gates 290 through 297 which have been conditioned by a D.C. signal from the zero terminal of a corresponding shift register will pass an output pulse to set flip-flops in a register to zero.

SUMMARY

An identification system has thus been described that identifies a moving object or vehicle as it moves past a wayside station. The identification device carried by the moving object or vehicle is relatively inexpensive, and the identification is accurate.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. In an identification system for moving objects wherein a receiving element and a transmitting element are provided on each such object, means on each such object having a plurality of stages for producing identification data, each stage of said identification means having a saturating magnetic core with two output windings responsive to the signal received by said carrier for imposing one bit of identification data from one output winding on the signal transmitted and imposing a second bit of identification data from the second output winding on the signal transmitted.

2. In an identification system for moving objects wherein a receiving element and a transmitting element are provided on each such object, a power source at a wayside station for producing an A.C. signal, means on each such object having a plurality of stages for producing identification data, each stage of said identification means having a saturating magnetic core with two output windings responsive to the A.C. signal received by said carrier for imposing one bit of identification data from one output winding on the transmitted signal during the positive half cycle and one bit of identification data from the other output winding on the transmitted signal during the negative half cycle.

3. In an identification system for moving objects wherein a receiving element is provided on each such object, a power source at a wayside station for producing an A.C. signal, means on each such object responsive to the A.C. signal received by said receiving element for transmitting a carrier waveform and means on each such object for modulating said transmitting means with a first portion of an identification number during the positive half cycle of the received A.C. signal and with a second portion of an identification number during the negative half cycle of the received A.C. signal.

4. An identification system for identifying objects as they pass a wayside station comprising means at the wayside station for producing an A.C. signal, means on said object for picking up the A.C. signal as the object passes the wayside station, means on said object operatively coupled to said pick up means and responsive to the A.C. signal for transmitting a carrier wave, means on said object operatively coupled to said pick up means and said transmitting means and responsive to the A.C. signal for imposing a first portion of an identification number on the carrier wave during the positive half cycle of the A.C. signal and for imposing a second portion of an identification number on the carrier wave during the negative half cycle of the A.C. signal, means at the wayside station for receiving the carrier wave, and means at the wayside station operatively coupled to said receiving means for decoding the identification number imposed thereon.

5. An object identification system for identifying objects as they pass a wayside station comprising a power source at the wayside station for producing an A.C. waveform, means on said object for picking up the A.C. waveform as the object passes the wayside station, a data source on said object operatively coupled to said pick up means for producing a plurality of time spaced identification signals in response to the A.C. signal picked up by said pickup means, said data source having a plurality of stages each including a saturating core which saturates a predetermined period of time later than the core of the next preceding section, each saturating core having two sampling windings for producing one identification signal from one sampling winding during the positive half cycle of the A.C. waveform and for producing a second identification signal from the second sampling winding during the negative half cycle of the A.C. waveform, a transmitter on said object operatively coupled to said pick up means and said data source and responsive to the A.C. waveform picked up by said pickup means and the identification signals produced by said data source for transmitting a carrier waveform with the identification signals imposed thereon, and means at the wayside station for receiving the carrier waveform with the identification signals imposed thereon.

References Cited by the Examiner

UNITED STATES PATENTS

| | | | |
|---|---|---|---|
| 2,796,602 | 6/57 | Hess et al. | 343—6.5 |
| 3,004,253 | 10/61 | Wilson | 343—6.5 |
| 3,054,100 | 9/62 | Jones | 343—6.5 |

CHESTER L. JUSTUS, *Primary Examiner.*